Patented June 15, 1954

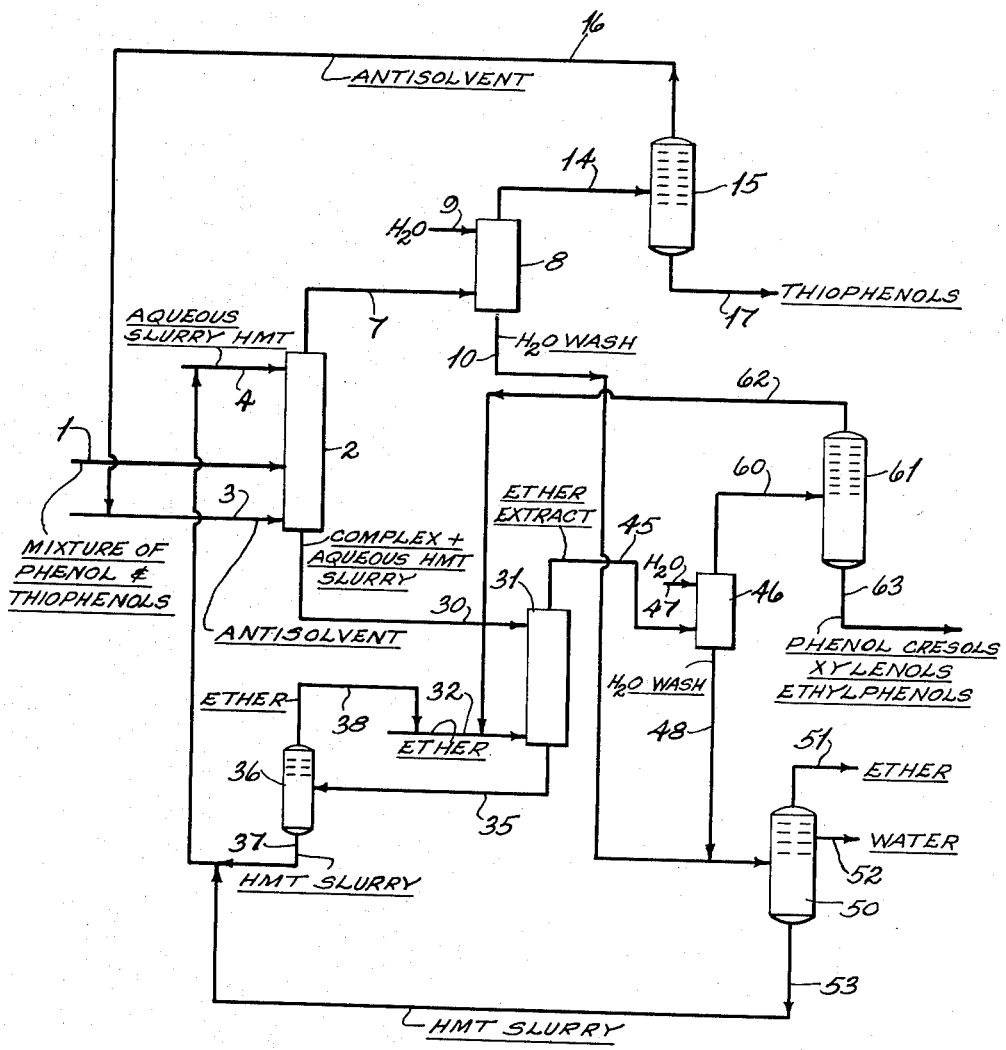

2,681,369

UNITED STATES PATENT OFFICE 2,681,369

SEPARATION OF PHENOLS FROM THIOPHENOLS

Howard V. Hess, Glenham, and Edwin C. Knowles, Poughkeepsie, N. Y., assignors to The Texas Company, New York, N. Y., a corporation of Delaware Application March 20, 1952, Serial No. 277,644

14 Claims. (Cl. 260—609)

1

This invention relates to a novel process for separating phenolic compounds from their sulfur analogs, namely, thiophenol and its homologs. It is particularly concerned with the separation of low molecular weight phenolic compounds such as phenol, cresols, ethylphenols and xylenols from thiophenolic compounds with which phenols are usually associated in natural sources such as coal tar, shale oil and petroleum naphtha.

In copending applications Serial No. 176,661, Serial No. 176,662, both filed on July 29, 1950, now U. S. Patents 2,618,664 and 2,618,665, respectively, and in Serial No. 226,644, filed May 16, 1951, all of which are filed in the names of Howard V. Hess and George B. Arnold, it is disclosed that low molecular weight phenolic compounds such as phenol, cresols, ethylphenols and xylenols are separated from crude mixtures containing higher molecular weight phenolic compounds and non-phenolic compounds by contact with hexamethylene tetramine in the presence of an antisolvent whereby there is formed a liquid complex phase which is insoluble in the antisolvent solution of the phenolic compound-containing mixture. The liquid complex phase which comprises complexes of hexamethylene tetramine with phenol, cresols, ethylphenols and xylenols separates from the antisolvent solution and is decomposed into its components by contact with an oxygenated hydrocarbon solvent such as ether which extracts the phenolic compounds from the complex phase. A paraffinic hydrocarbon or a mixture of paraffinic and/or naphthenic hydrocarbons is employed as the anti-solvent with a pentane fraction being a particularly preferred antisolvent.

The subject invention involves the surprising discovery that complexing action of hexamethylene tetramine in the presence of an antisolvent is specific to low molecular weight phenolic compounds so that separation of low molecular weight phenols from thiophenolic compounds can be effected therewith. Since thiophenolic compounds are more highly acidic than the corresponding phenolic compounds, it was particularly surprising to discover that a basic complexing agent such as hexamethylene tetramine in the presence of an anti-solvent was able to distinguish between phenol and its more acidic analog, thiophenol. The discovery that a mixture of phenols and thiophenols is readily separated into its phenolic and thiophenolic components by the use of hexamethylene tetramine in conjunction with an antisolvent is of substantial import, since separation of phenols from thiophenols by presently available procedures is troublesome and consumes substantial quantities of chemicals.

2

In accordance with the process of this invention, low molecular weight phenolic compounds such as phenol, cresols, ethylphenols and xylenols are separated from thiophenol and its homologs by contacting a mixture containing both phenols and thiophenols with hexamethylene tetramine in the presence of an antisolvent whereby there is formed a liquid complex phase which is insoluble in the antisolvent solution and is readily separated therefrom. After separation of the liquid complex phase, which comprises complexes of hexamethylene tetramine with phenol, cresols, ethylphenols and xylenols, it is washed with antisolvent and then decomposed into its components by extraction with an oxygenated hydrocarbon solvent whereby there is formed hexamethylene tetramine and an extract phase containing low molecular weight phenols which are substantially free from thiophenolic contaminants. The thiophenolic components of the original mixture are recovered from the antisolvent solution of crude mixture and from the wash solution obtained by washing the complex phase prior to its decomposition. A paraffinic hydrocarbon, a naphthenic hydrocarbon or a mixture of such hydrocarbons is employed as the antisolvent; a pentane fraction is a particularly preferred antisolvent. Contact of the phenol- and thiophenol-containing mixture with hexamethylene tetramine is normally effected in the presence of an antisolvent, but it is possible to effect the contact in the absence of the antisolvent and subsequently add antisolvent with the resulting separation of the complex phase. Decomposition of the separated liquid complex phase is effected by extraction with an oxygenated hydrocarbon solvent such as ether and tetrahydrofurane.

Contact of the aromatic mixture containing low molecular weight phenols and thiophenols with hexamethylene tetramine is ordinarily effected at atmospheric temperature, but the upper allowable temperature is approximately 180° F. Decomposition of the separated complex phase with an oxygenated hydrocarbon solvent for recovery of low molecular weight phenols is also effected at temperatures below 180° F.

Solid anhydrous hexamethylene tetramine in powder form or aqueous hexamethylene tetramine in the form of a solution or slurry can be employed as the complexing agent. When solid anhydrous hexamethylene tetramine is employed as the complexing agent, there is a solids handling problem in that the two-phase mixture comprising liquid complex phase and anti-solvent solution of aromatic mixture must be separated by filtration or decantation from the excess solid complexing agent. The solids handling problem is eliminated when an aqueous solution or slurry of hexamethylene tetramine is employed as a complexing agent since the use of aqueous hexamethylene tetramine as the complexing agent permits the utilization of a complete liquid-liquid system for separating low molecular weight phenolic compounds from crude aromatic mixtures. An additional advantage of the use of aqueous hexamethylene tetramine as the complexing agent is that better molecular contact between low molecular weight phenolic compounds and the complexing agent is effected with the result that a faster and more effective operation is realized. The invention will be described hereafter with aqueous hexamethylene tetramine as the complexing agent.

Phenol, cresols and xylenols, which are important commercial chemicals because of their extensive use in the manufacture of resins, dyes, pharmaceuticals and petroleum additives, are obtained mainly from natural sources such as coal tar, wherein they are associated with thiophenolic compounds. Because of the similar chemical nature of phenols and thiophenols, the former processes employed to isolate phenolic compounds from coal tar and other sources fail to differentiate between these compounds with the result that the recovered product is a mixture of both phenolic and thiophenolic compounds. These normal procedures employed for recovery of phenolic compounds involve extraction with solvents such as solutions of caustic soda, sodium carbonate and sodium sulfide, aqueous alcohol, pyridine sulfate solution, formic acid solution and solutions of sodium phenolate.

The resolution of the product obtained by these common solvent extraction processes into phenols and thiophenolic compounds has been troublesome, but necessary, since many of the contemplated uses of the low molecular weight phenols preclude the presence of thiophenols which are highly odoriferous compounds. Moreover, thiophenols are in demand as chemical intermediates in the preparation of lube oil additives. The process of this invention provides a simple means for resolving a mixture of phenolic and thiophenolic compounds into its components and is, consequently, a significant contribution to the field of aromatic chemistry.

The process of this invention is only applicable to the separation of low molecular weight phenolic compounds which term is specifically used to describe phenol, itself, cresols, ethylphenols and xylenols from thiophenolic compounds. It is apparent that the primary usefulness of the process of the invention is separating these low molecular weight phenolic compounds from thiophenolic compounds of similar molecular weight and of corresponding similar boiling point; separation of low molecular weight phenols from high molecular weight thiophenolic compounds is normally effected on the basis of boiling point. The process of the invention may also be used to separate an individual phenolic compound from its thiophenolic analog, for example, to separate phenol from thiophenol or cresols from thiocresol.

The complexing agent employed in the process of this invention is hexamethylene tetramine, a well known and commercially available condensation product of formaldehyde and ammonia. Hexamethylene tetramine is employed medicinally under the name of Urotropin.

The antisolvent whose presence causes separation of a liquid complex phase from the crude aromatic mixture is a paraffinic hydrocarbon which is advantageously an aliphatic hydrocarbon containing 3 to 10 carbon atoms. When normally gaseous aliphatic hydrocarbons, such as propane and butane, are employed as antisolvents, it is necessary to employ a pressure system. Pentanes and hexanes are particularly preferred antisolvents, since they are easily recovered from the aromatic mixture. Naphthenes such as cyclohexane and cyclopentane are effective antisolvents. Mixtures of paraffinic hydrocarbons such as straight run naptha and petrol ether may also be employed as the antisolvent. Ordinarily, an equal volume of antisolvent is added to the phenol- and thiophenol-containing mixture, but the volume ratio of antisolvent to crude aromatic mixture may vary between 0.5 and 5 with high volume ratios being used when the phenolic content of the acid oil is low and low volume ratios when the phenolic content is high.

Contact of the antisolvent solution of phenol- and thiophenol-containing aromatic mixture with aqueous hexamethylene tetramine must be effected at a temperature below 180° F. in order to avoid resin formation. Usually contact of the aromatic mixture and hexamethylene tetramine is effected at temperatures between 50 and 120° F. Since formation of the complex phase and its separation from the aromatic mixture are apparently not effected by pressure, atmospheric pressure is normally used, although both subatmospheric and superatomspheric pressures may be employed. Superatmospheric pressures are prescribed when a normally gaseous hydrocarbon such as propane is employed as the antisolvent.

A number of different procedures may be employed to contact the antisolvent solution of aromatic oil and aqueous hexamethylene tetramine. A preferred procedure involves countercurrent contact of antisolvent solution of aromatic oil and aqueous hexamethylene tetramine in a tower. This type system is equivalent to a countercurrent extraction system and results in excellent separation of low molecular weight phenols from thiophenols in a single pass. Batch-wise operation in mixing vessels equipped with agitators may also be employed, but it does not possess the efficiency of countercurrent tower contacting. A contact time adequate to assure substantially complete complex formation is desired; 10 to 20 minutes of contact time has been found adequate for complex formation and separation of complex from the antisolvent solution containing thiophenols and aromatic oil.

It is necessary to wash separated complex phase with antisolvent in order to remove dissolved aromatic mixture therefrom. In a countercurrent system this washing is simply effected by introduction of the antisolvent into the contacting tower at a point below where the aromatic oil is introduced so that complexing and washing are effected in a unitary operation.

Ordinarily, decomposition of the complex phase is effected in the presence of the aqueous phase which is either a solution or slurry of complexing agent. When the combined complex and aqueous phases are subjected to contact with ether, the complex is decomposed with a liberation of low molecular weight phenols which dissolve in the ether and with the liberation of hexamethylene tetramine which is taken up in the aqueous phase. Decomposition of the complex is advantageously effected by a countercurrent extraction operation wherein the combined complex and aqueous phases are contacted countercurrently with ether with the resulting decomposition of the complex and extraction of liberated low molecular weight phenols in the ether extract phase. When the complexes are decomposed in the presence of the aqueous phase, there is no solids handling problem since the liberated hexamethylene tetramine dissolves in the aqueous phase.

If the phenol-hexamethylene tetramine complex phase is decomposed in the absence of the aqueous phase, the liberated hexamethylene tetramine is precipitated as a solid on treatment of the liquid complex phase with ether. The advantages of effecting decomposition in the presence of an aqueous phase are apparent, since such treatment eliminates handling of solid hexamethylene tetramine.

Decomposition of the complex phase may be effected with oxygenated compounds, such as aliphatic ethers and cyclic ethers, and, in general, with those oxygenated solvents which have a high solvent power for phenols and a low solvent power for hexamethylene tetramine and for water. In addition, water is a suitable solvent for decomposition of the complex if the phenols involved in the complex are substantially insoluble in water. Since water decomposes the complex by dissolving the hexamethylene tetramine portion thereof, it is apparent that it may only be employed where the complex phase comprises substantially water-insoluble phenols, such as xylenols and ethylphenols. Particularly preferred solvents are diethyl ether and tetrahydrofurane.

Decomposition of the complex by contact with ether or water is effected at temperatures below 180° F. in order to avoid resin formation. The usual temperatures employed for complex decomposition are in the range of 50 to 120° F. Since there is no advantage in employing higher temperatures for complex decomposition, it is ordinarily effected at atmospheric temperature.

The extract phase containing phenol compounds obtained by decomposition of the complex phase is washed with water prior to recovery of phenols in order to remove dissolved hexamethylene tetramine. The volume of wash water is ordinarily equivalent to the volume of the extract solution washed; volume ratios of wash to extract solution between 0.1 and 2 are prescribed. The removal of hexamethylene tetramine from the extract phase prevents resin formation on heat stripping of the decomposition solvent from the phenolic compounds and on their fractionation into individual phenolic components.

Thiophenolic compounds are recovered from the antisolvent solution of hexamethylene tetramine treated aromatic mixture and from the wash solution obtained on subjecting the liquid complex to washing with antisolvent. In countercurrent contact of phenol- and thiophenol-containing aromatic mixture with aqueous hexamethylene tetramine wherein washing with the antisolvent is effected in the lower portion of the tower, the antisolvent wash solution combines with the antisolvent solution of aromatic mixture. Recovery of thiophenols from the antisolvent solution is simply effected by fractional distillation if the original aromatic mixture comprises only phenols and thiophenols since there is a substantial boiling point differential between an antisolvent such as pentane and the thiophenols. If thiophenols are recovered from the antisolvent solution by fractional distillation, it is advisable to subject the antisolvent solution to water washing prior to distillation in order to remove traces of hexamethylene tetramine which will form condensation products with thiophenols during the distillation step. An alternate procedure for recovering the thiophenols from the antisolvent solution involves a conventional procedure such as extraction with a caustic solution. Since thiophenols are the only remaining acidic compounds present in the antisolvent solution, they are isolated as a caustic extract from which they are sprung by acidification.

In the accompanying drawing, there is diagrammatically outlined a continuous flow for resolving a mixture containing low molecular weight phenols and thiophenolic compounds into their phenolic and thiophenolic components.

In the diagram presented, an aqueous slurry of hexamethylene tetramine in the presence of an antisolvent is used to differentiate between phenolic and thiophenolic compounds.

A mixture of phenols and thiophenols which is a fraction of coal tar distillate boiling between 350 and 480° F., and which is hereafter termed aromatic oil, is introduced through a pipe 1 into the middle portion of a tower 2 which acts as a complexing, separating and washing zone. Approximately an equal volume of pentane antisolvent is introduced into the lower portion of the tower 2 through a pipe 3 while an aqueous slurry of hexamethylene tetramine is introduced into the upper portion of the tower 2 through a pipe 4.

Countercurrent contact of the pentane solution of aromatic oil containing low molecular weight phenols and thiophenols with the aqueous slurry of hexamethylene tetramine results in the formation of hexamethylene tetramine complexes of the low molecular weight phenols which separate as a distinct liquid phase which is intermediate in density between the pentane solution of aromatic oil and the aqueous slurry of hexamethylene tetramine so that it forms the middle layer of a static system.

There is withdrawn from the upper portion of the tower 2 through a pipe 7 a pentane solution of aromatic oil which contains substantially all of the thiophenols present in the original feed, but whose content of low molecular weight phenols is very small. The pentane solution of thiophenol-containing aromatic oil is introduced into a wash tower 8 wherein it is subjected to countercurrent washing with water which is introduced therein through a pipe 9. Water washing removes residual hexamethylene tetramine from the pentane solution of thiophenols prior to heat stripping the pentane therefrom and prevents resin formation in the further treatment of the thiophenol-containing aromatic oil. The water wash is removed from the wash tower 8 through a pipe 10 and is treated as will be described hereafter to recover the hexamethylene tetramine therefrom.

The water-washed pentane solution of thiophenolic aromatic oil is removed from the wash tower 8 through a pipe 14 and is introduced into a tower 15 wherein pentane is removed by stripping. Pentane is taken off overhead through a pipe 16 and is recycled therethrough to a pipe 3 through which it is introduced into the tower 2.

From the bottom portion of the tower 15 through a pipe 17, there is withdrawn an aromatic oil containing thiophenols. If the low molecular weight phenolic content of this oil has not been sufficiently reduced by once-through operation, it can be recycled to the tower 2. Under normal operation conditions, once-through operation, as described, reduces the low molecular weight phenolic content to a sufficiently low level. The thiophenols can be recovered from the aromatic oil by conventional caustic extraction.

The aqueous slurry of hexamethylene tetramine and the liquid complex phase flowing downwardly through the tower 2 are washed free of thiophenols and other aromatic impurities by contact with pentane in the lower portion of the tower 2. The pentane-washed mixture of aqueous hexamethylene tetramine slurry and liquid complex phase is withdrawn from the tower 2 through a pipe 30 and is introduced into a tower 31 wherein it is extracted with ether which is introduced into the tower 31 through a pipe 32. Contact of the composite mixture of complex phase and aqueous slurry with ether effects decomposition of the complex into its components with extraction of the thiophenol-free low molecular weight phenols in the ether extract phase and the suspension of the hexamethylene tetramine in the aqueous slurry.

The hexamethylene tetramine slurry is withdrawn from the bottom of the tower 31 through a pipe 35, stripped of ether in the stripper 36 and recycled to the contact tower 2 through a pipe 37. Stripped ether is recycled to tower 31 through pipes 38 and 32.

The ether extract phase containing thiophenol-free low molecular weight phenolic compounds is removed from the upper portion of tower 31 through a pipe 45 and introduced into a wash tower 46 wherein it is subjected to counter-current washing with water introduced therein through a pipe 47 with resulting removal of dissolved hexamethylene tetramine therefrom. Wash water containing a small percentage of hexamethylene tetramine, approximately 1 to 4 per cent, is withdrawn from the wash tower 46 through a pipe 48, combined with the wash water obtained from washing of the pentane solution of thiophenol-containing aromatic oil in the tower 8. The combined wash waters are introduced into a stripper 50 wherein both ether and water are stripped therefrom to obtain an aqueous slurry of hexamethylene tetramine which can be recycled to the contacting zone. The ether is removed from the stripper 50 through a pipe 51 while water is removed therefrom through a pipe 52. The aqueous hexamethylene tetramine slurry obtained in the stripping operation is removed from the bottom of the stripper 50 and is recycled through pipes 53 and 37 to the contact tower 2.

The water-washed extract ether phase containing thiophenol-free low molecular weight phenols is withdrawn from the wash tower 46 through a pipe 60 and is introduced into a stripping tower 61 for removal of ether. Ether is taken off from the stripping tower 61 through a pipe 62 and is recycled therethrough to the extraction tower 31.

Low molecular weight phenols comprising phenol, cresols, ethylphenols and xylenols are withdrawn from the bottom of the stripping tower 61 through a pipe 63. These low molecular weight phenols which are free from thiophenols can be resolved into individual components by fractional distillation.

The following example illustrates the use of the process of this invention in resolving the mixture of phenols and thiophenols. In this example, the separation process of the invention is applied to an aromatic acid oil consisting predominantly of phenols and thiophenols which have been obtained by acidification of an aqueous caustic solution obtained on caustic scrubbing of petroleum naphtha.

200 cc. of an aromatic acid oil distilling between 350 and 450° F. and obtained by acidification of an aqueous caustic extract resulting from caustic scrubbing of petroleum naphtha was diluted with 500 cc. of pentane and then contacted with 1,200 cc. of an aqueous saturated hexamethylene tetramine solution. The reaction mixture settled to form a 3-phase liquid system comprising a pentane-rich phase, a complex-rich phase and an aqueous hexamethylene tetramine-rich phase. The pentane-rich phase was separated from the complex phase and the aqueous hexamethylene tetramine phase, was water-washed and stripped of pentane to yield 43 cc. of a thiophenol-rich fraction which analyzed 21.7 weight per cent sulfur as compared with 5.45 per cent sulfur content of the original aromatic acid oil. The combined aqueous and complex-rich phases were subjected to washing with pentane to yield a pentane wash from which there was obtained after water washing and stripping an additional 10 cc. of a thiophenol-rich concentrate which analyzed 19.1 weight per cent sulfur.

The pentane-washed combined aqueous and complex-rich phases were extracted with an equal volume of ether to yield an ether extract which was washed with an equal volume of water and stripped of ether to yield 118 cc. of a thiophenol-free concentrate comprising low molecular weight phenolic compounds. This phenol-rich concentrate only analyzed 0.23 weight per cent sulfur, as contrasted with the 5.45 per cent sulfur content of the original aromatic acid oil.

The foregoing example clearly illustrates the effectiveness of this invention in resolving a mixture of phenols and thiophenols. The low sulfur content of the phenol fraction and the high sulfur content of the thiophenol concentrate prove that excellent resolution of the mixture has been effected in the batch operation described. A continuous countercurrent system effects even better resolution.

While the oil treated in the foregoing example comprises predominantly phenols and thiophenols, it is apparent that the process of the invention is applicable to the separation of phenols from thiophenols in mixtures such as coal tar distillate, wherein low molecular weight phenols and thiophenols are associated with a large amount of neutral aromatic compounds such as alkylbenzenes.

Obviously many modifications and variations of the invention as hereinbefore set forth may be made without departing from the spirit and scope thereof, and, therefore, only such limitations should be imposed as are indicated in the appended claims.

We claim:
1. A process for separating low molecular weight phenolic compounds of the group consisting of phenol, cresols, ethylphenols and xylenols from thiophenol and its homologs which comprises contacting a mixture containing said phenolic and thiophenolic compounds with hexamethylene tetramine at a temperature below 180° F., separating said reaction mixture in the presence of an antisolvent selected from the group consisting of paraffinic and naphthenic hydrocarbons and mixtures thereof into an anti- solvent solution and a distinct liquid complex phase consisting mainly of hexamethylene tetramine and said low molecular weight phenolic compounds, decomposing said complex phase into hexamethylene tetramine and low molecular weight phenolic compounds substantially free of thiophenolic compounds by extraction with a solvent selected from the group consisting of water and oxygenated hydrocarbons having a high solvent power for phenols and a low solvent power for hexamethylene tetramine and water at a temperature below 180° F. whereby there is formed an extract phase containing said low molecular weight phenols, recovering said phenols from said extract phase and recovering thiophenols from said antisolvent solution.

2. A process according to claim 1 in which decomposition of the complex phase is effected with an ether.

3. A process according to claim 1 in which solid anhydrous hexamethylene tetramine is the complexing agent.

4. A process according to claim 1 in which aqueous hexamethylene tetramine is the complexing agent.

5. A process for separating low molecular weight phenolic compounds of the group consisting of phenol, cresols, ethylphenols and xylenols from thiophenol and its homologs which comprises contacting a mixture containing said phenolic and thiophenolic compounds with hexamethylene tetramine at a temperature below 180° F. in the presence of an antisolvent selected from the group consisting of paraffinic and naphthenic hydrocarbons and mixtures thereof, said contact resulting in the formation of thiophenol-containing anti-solvent solution and a distinct liquid complex phase consisting mainly of complexes of said hexamethylene tetramine and said low molecular weight phenols, separating said complex phase from said antisolvent solution, decomposing complex phase into hexamethylene tetramine and low molecular weight phenolic compounds substantially free of thiophenolic compounds by extraction with an oxygenated hydrocarbon having a high solvent power for phenols and a low solvent power for hexamethylene tetramine and water at a temperature below 180° F. whereby there is formed an extract phase containing said low molecular weight phenols, recovering said phenols from said extract phase and recovering thiophenols from said antisolvent solution.

6. A process according to claim 5 in which aqueous hexamethylene tetramine is the complexing agent.

7. A process according to claim 5 in which solid anhydrous hexamethylene tetramine is the complexing agent.

8. A process according to claim 5 in which decomposition of the complex is effected by extraction with an ether.

9. A process according to claim 5 in which said separated complex phase is washed with antisolvent prior to its decomposition by extraction with an oxygenated hydrocarbon.

10. A process according to claim 5 in which the phenol-containing extract phase is water washed prior to recovery of phenols therefrom.

11. A process according to claim 5 in which said antisolvent solution is water washed prior to recovery of thiophenols therefrom.

12. A process according to claim 5 in which pentane is used as the antisolvent.

13. A process according to claim 5 in which contact of said phenol- and thiophenol-containing mixture with hexamethylene tetramine in the presence of said antisolvent and decomposition of said complex are effected at a temperature between 50 and 120° F.

14. A process according to claim 5 in which the antisolvent is a paraffinic hydrocarbon containing 3 to 10 carbon atoms.

References Cited in the file of this patent

UNITED STATES PATENTS

| Number | Name | Date |
|---|---|---|
| 1,779,715 | Scott | Oct. 28, 1930 |
| 1,955,023 | Roos et al. | Apr. 17, 1934 |
| 2,184,928 | Luten et al. | Dec. 26, 1939 |
| 2,310,616 | Cislak et al. | Feb. 9, 1943 |